H. E. DICKINSON.
ADJUSTABLE SPLIT LOCK NUT OR UNION.
APPLICATION FILED FEB. 6, 1919.
1,323,967.
Patented Dec. 2, 1919.
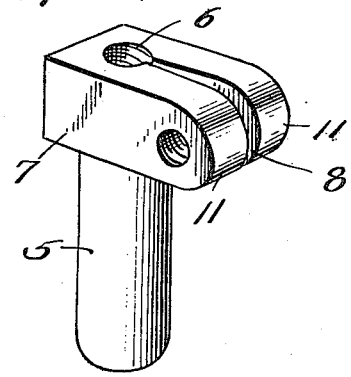
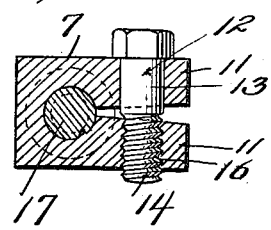
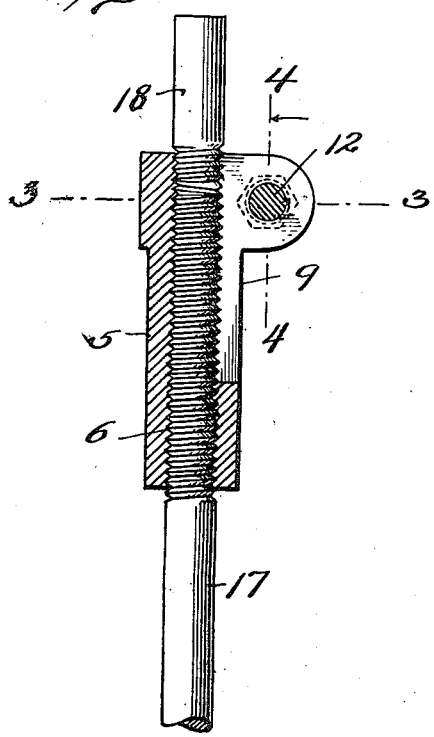
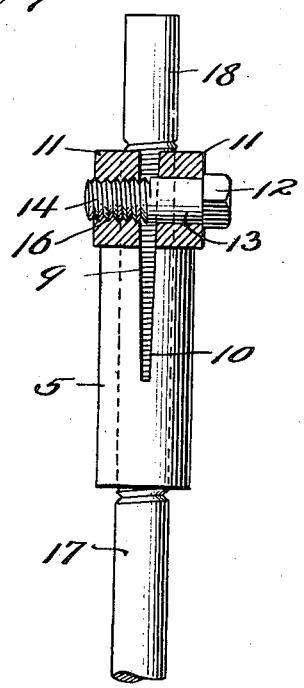
Witness
Chas. S. Hyer,
Inventor
Harry E. Dickinson
By
Attorney

UNITED STATES PATENT OFFICE.

HARRY E. DICKINSON, OF SAN ANTONIO, TEXAS.

ADJUSTABLE SPLIT LOCK-NUT OR UNION.

1,323,967.  Specification of Letters Patent.  Patented Dec. 2, 1919.

Application filed February 6, 1919. Serial No. 275,352.

*To all whom it may concern:*

Be it known that I, HARRY E. DICKINSON, a citizen of the United States, residing at San Antonio, in the county of Bexar and State of Texas, have invented new and useful Improvements in Adjustable Split Lock-Nuts or Unions, of which the following is a specification.

This invention relates to adjustable unions in the form of split lock nuts, and a primary object of the same is to provide a device of this character of a simple, cheap and efficient construction for particular use on valve rods of internal combustion engines, especially those used in automobiles and aeroplanes or on those motors or engines employing overhead valves, capable of being readily and securely locked on a valve rod to stand the strain of direct pressure, blows and torque action while in motion, and also easily and quickly adjustable to take up wear on the terminals of the valve rod.

A further object of the invention is to provide an improved adjustable union or split lock nut of suitable hardened cast metal and embodying in the formation thereof a squared head extension and round shaft, which is cored or reamed through the center and threaded, the squared head extension being split by slotting the same and extending the slot into the tubular shaft portion of the union and whereby a positive gripping and clamping may be produced with advantages in the application and adjustment of the union.

A still further object of the invention is to provide an improved union or split lock nut of the class specified, capable of being easily fitted, adjusted and so firmly and tightly contracted or clamped on a valve rod or any other analogous device that there will be no jumping or slipping, jamming or breaking of the threads and the union or lock nut will, as a consequence, be tightly, firmly and permanently locked when applied.

With these and other objects in view the invention consists in the construction, arrangement and combination of parts, hereinafter described, and illustrated in one of its applications in the accompanying drawing and particularly pointed out in the appended claims.

In the drawing—

Figure 1 is a perspective view of the improved union or split lock nut.

Fig. 2 is a longitudinal vertical section showing the improved union or split lock nut applied.

Fig. 3 is a horizontal section taken on line 3—3, Fig. 2.

Fig. 4 is a sectional elevation, the section being taken on the line 4—4, Fig. 2.

The attachment of the improved union or split lock nut comprises a shaft or shank 5 of any suitable length which is preferably formed of cast metal, properly hardened, and is cored or reamed through the center by a lathe and then threaded to provide a screw-threaded bore 6 extending completely therethrough. The shaft or shank 5 is preferably circular in cross-section, and at one end is formed or provided with a substantially squared head 7, the bore 6 continuing through the head and from this bore, and in one free end of the head a slot 8 is cut and extended part way through the length of the shaft or shank 5. The slot 8 in the head and in a portion of the shaft or shank is wider than the remaining part of the slot, as at 9, (see Fig. 4), the narrow part 10 of the slot continuing longitudinally through a portion of the length of the shaft or shank 5. This slot as a whole is of V-shaped contour, the wider part of the slot being in the head 7 and from the latter tapering into the shaft of shank 5, as particularly shown by Fig. 4. The squared head 7 is extended a greater distance to one side of the shaft or shank 5 than at the opposite side, and through this greater extension of the head the slot 8 is formed and provides what may be termed jaws or clamping members 11 which have a certain amount of resiliency or relative movement through the medium of a drawbolt or headed screw 12 having a smooth shank portion 13 and a threaded extremity 14 respectively engaging a smooth bore 15 in one jaw 11 and a screw threaded bore 16 in the remaining jaw, the bores 13 and 16 being necessarily in alinement and extending transversely through the jaws. The contraction and expansion of the jaws 11 through the tightening and loosening of the bolt or screw 12 affects also that part of the shaft or shank 5 into which the slot 8 continues in the form hereinbefore described, and by this means a clamping action may be set up throughout a part of the length of the shaft or shank 5 to a more or less degree relatively to the device or devices that may be connected or held by the improved union or split lock nut. While the head 7 is shown as being formed substantially square it will be understood that the configuration thereof may be modified or that a restriction to a square form is not absolutely necessary to render the improved attachment effective in the performance of the function for which it has been devised. In some uses or applications of the improved union or split lock nut the extension head 7 may serve as a contacting means, or tapping means, or an engaging device operating after the manner of a wiper having a fixed contacting surface, and in other instances a tappet rod or a part of a shaft may be secured and held by the head and the shaft or shank. The bolt 12, as will be seen, serves as a draw-bolt and may be readily operated to tighten and loosen the same by a wrench applied to the head thereof, and after the jaws 11 and the slotted portion of the shaft or shank 5 have been relaxed sufficiently to permit detachment of the improved union or split lock nut, the latter may be moved or shifted, or, the parts held thereby adjusted to take up wear or to otherwise compensate for mechanical requirements that may be present in connection with the mechanism with which the improved device is used.

As shown by Figs. 2 and 3 and 4 a screw threaded rod 17 which may be a valve rod is shown in engagement with the shaft or shank 5 and projected from one end of said shaft or shank, and extending outwardly from the bore 6 of the head extension 7 is a rod tappet or analogous device 18, these parts being in threaded engagement with the bore 6 and when the jaws 11 are tightened they will be firmly and positively clamped against movement or any tendency of slipping away from the desired adjustment, and this clamping action will be effected through a part of the length of the shaft or shank 5, by reason of the extension of the slot 8 thereinto. The wider portion 9 of the slot 8 provides for a greater range of adjustment and movement of the jaws and the narrower portion 10 of the slot compensates for the relatively less clamping action of a portion of the shaft or shank 5, but, as hereinbefore noted, the combined wide and narrow slot structure gives a greater clamping action of the device on the parts held in or by the improved device.

The slotted structure, as specified, also permits a leverage whereby the draw-bolt in its clamping action causes a powerful grip or clutch by drawing the slotted portions together, and furthermore the differentiation in the width of the slot provides for an equal pressure along the entire length of the slot so that the clutch or grasping action of the improved device will be strong and institute a permanent hold relatively to the device or devices engaged by the improved union or split lock nut along the entire length of the slot. Furthermore the positive clutching or grasping action set up by the improved device will form a permanent union between the parts connected thereby and withstand wear and tear of the action of direct pressure on the head as well as blows or torque movements.

The proportions and dimensions of the improved device may be varied at will to adapt the same to various applications.

I claim as my invention—

1. An adjustable contacting device adapted for use in connection with a valve operating rod of internal combustion engines and the like, the combination with a valve rod having a threaded portion, of a shank longitudinally bored and threaded, the bore extending fully therethrough and the shank having a head laterally projecting from one end and forming a part thereof, the said head being slotted from the bore outwardly through the outer terminal of the head and the slot continuing longitudinally through a portion of the length of the shank, the slot having its widest portion in the head and gradually tapering to the terminal thereof in the shank, the opposite side walls of the slot also normally converging inwardly toward the bore of the shank, and means transversely engaging the split extension of the head for drawing the parts of the latter and the slotted portion of the shank in clamping relation to the rod.

2. The combination with a valve rod having a threaded extremity, of a shank having a threaded bore extending longitudinally therethrough for engagement with the threaded extremity of the valve rod, the shank being formed with a head at one end provided with a lateral extension, the head and extension being slotted from the bore of the shank outwardly through the extension and the slot continued partially through the longitudinal extent of the shank, the slot tapering from its widest portion in the head and extension of the latter to the terminal thereof in the shank and also normally converging inwardly through all parts in which it is formed to the threaded bore of the shank, a tappet device secured in the upper portion of the bore continuing through the head, and a clamping bolt with a threaded extremity transversely engaging the slotted extension of the head for drawing the parts of the head and also the slotted portion of the shank into clamping stress with relation to the valve rod and tappet device.

In testimony whereof I have hereunto set my hand in presence of two subscribing witnesses.

HARRY E. DICKINSON.

Witnesses:
 MATILDA REHME,
 M. L. ROARK.